FLASH ASSEMBLY FOR CAMERAS

Original Filed Nov. 23, 1962 2 Sheets-Sheet 1

INVENTOR
PAUL FROST
FRIDOLIN HENNIG
BY
Michael S. Striker
Attorney

FLASH ASSEMBLY FOR CAMERAS

Original Filed Nov. 23, 1962 2 Sheets-Sheet 1

INVENTORS
PAUL FROST
FRIDOLIN HENNIG
BY
Michael S. Striker
Attorney

United States Patent Office

Re. 26,300
Reissued Nov. 21, 1967

26,300

FLASH ASSEMBLY FOR CAMERAS

Paul Frost and Fridolin Hennig, Munich, Germany, assignors to Agfa Aktiengesellschaft, Leverkusen-Bayerwerk, Germany Original No. 3,204,541, dated Sept. 7, 1965, Ser. No. 239,572, Nov. 23, 1962. Application for reissue Oct. 18, 1966, Ser. No. 595,550

Claims priority, application Germany, Feb. 1, 1962, A 39,344

19 Claims. (Cl. 95—11)

Matter enclosed in heavy brackets [ ] appears in the original patent but forms no part of this reissue specification; matter printed in italics indicates the additions made by reissue.

*ABSTRACT OF THE DISCLOSURE*

*A flash assembly for cameras. Setting means is provided for setting at least in part the structure of the camera which determines the exposure made by the camera, the setting means adapted to be moved into a flash setting position providing a proper setting for an exposure with flash illumination. Support means. Receiving means for receiving a flash lamp introduced into the receiving means by movement of a portion of the lamp along a predetermined path. Movable blocking means having an engaging portion located in the predetermined path movable in direction of the path by the lamp so that the movable blocking means is moved by the lamp during introduction thereof along the predetermined path from an inoperative first position into a second position, the movable blocking means also having a blocking portion cooperating with the setting means so as to maintain the setting means in the flash setting position while the movable blocking means is in the second position thereof. Manually engageable means operatively connected to the movable means and accessible to the operator for manually moving the movable blocking means from the second position to the inoperative first position thereof for ejecting a lamp from the receiving means after an exposure has been made with flash illumination and for simultaneously releasing the setting means for movement from the flash setting position into other setting positions thereof.*

The present invention relates to cameras.

More particularly, the present invention relates to cameras which are adapted to make exposures with flash illumination.

As is well known, in cameras of this type it is necessary to provide particular settings on the camera in order to provide a proper exposure with flash illumination. Often it happens that the operator of the camera through neglect does not make the proper settings so that when an exposure is made with flash illumination improper exposures are made.

It is accordingly a primary object of the present invention to provide for a camera of the above type a structure which will precent an exposure from being made with flash illumination unless the camera has been at least partly set in order to make a proper exposure for flash illumination.

Another object of the present invention is to provide a structure which will prevent tripping of the shutter of the camera unless the camera has first been set to make a proper exposure for flash illumination.

A still further object of the present invention is to provide a structure of the above type which will not only prevent making of a flash exposure unless a proper camera setting for flash exposure has first been provided but which is also capable of being used for ejecting from the camera a flash bulb which has already been ignited during the making of a previous exposure.

Still another object of the present invention is to provide a structure of the above type which is characterized by extreme simplicity and reliability in operation as well as by its capability of permitting normal operation of the camera without flash illumination as well as guaranteeing proper setting of the camera to make a proper exposure with flash illumination.

With these objects in view of the invention includes, in a camera, a receiving means for receiving a flash lamp. A setting means is also provided for setting at least part of the structure of the camera which determines the exposure which is made thereby, and of course this setting means must be placed in a predetermined position to provide a proper exposure with flash illumination. In accordance with the present invention a movable blocking means is provided for blocking introduction of a lamp into the receiving means, and this movable blocking means is controlled by the setting means to prevent introduction of a lamp into the receiving means unless the setting means has been initially placed in a position providing a setting which will give a proper exposure for flash illumination, so that with the structure of the invention unless the setting means is in the latter position the blocking means will block movement of a flash lamp into the receiving means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a perspective illustration of still another embodiment of a structure according to the present invention, FIG. 4 showing the structure as it appears from the rear while FIGS. 2 and 3 show the structure as it appears from the front.

Figure 1:
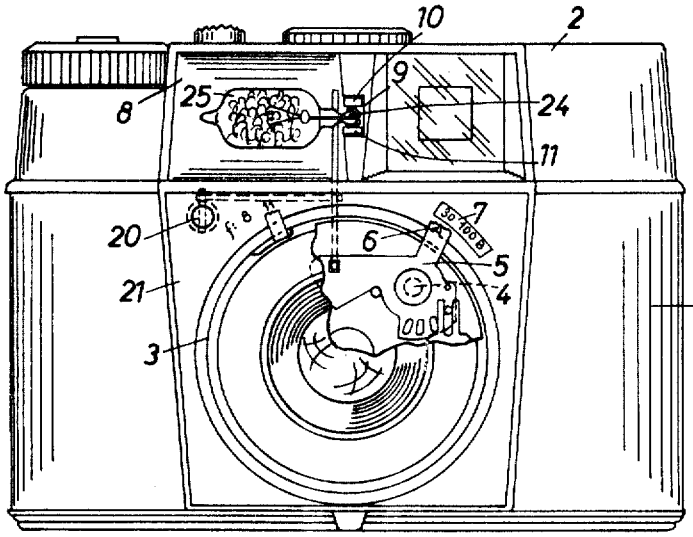
FIG. 1 is a front view of a camera provided with the structure of the invention, part of the camera structure being broken away to illustrate clearly the structure of the invention in the interior of the camera.
Figure 2:
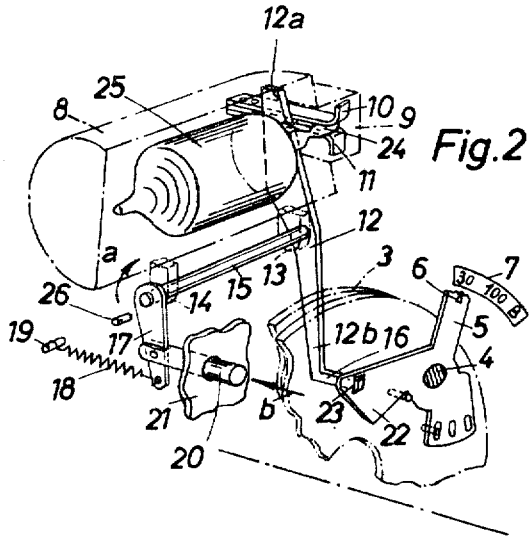
FIG. 2 is a perspective view of those elements of FIG. 1 which pertain to the invention.

According to the embodiment of the invention which is illustrated in FIGS. 1 and 2, the camera 1 has an upper part 2 and also includes an objective assembly 3 which includes such elements as the shutter and diaphragm. In the objective assembly there is a stationary pin 4 which extends parallel to the optical axis and which serves to pivotally mount a setting means 5 which at least partly determines the setting of the structure which determines the exposure made by the camera. In the illustrated example the setting means 5 sets the exposure time. This setting means 5 which is turnably carried by the pin 4 includes an index 6 which cooperates with a scale 7, this scale 7 having exposure times thereon, and of course the setting means 5 is capable of being manually turned to provide a selected exposure time. Thus, it will be noted that a portion of the setting means 5 extends outwardly beyond the housing of the objective assembly 3 so as to be accessible to the operator who can turn the index 6 into alignment with a selected graduation of the scale 7.

In the upper part 2 of the camera there is built permanently into the camera a forwardly directed, trough shaped reflector 8. At the right side wall of the reflector 8, as viewed in FIGS. 1 and 2, there is an elongated hollow member 9 which communicates with the interior of the reflector 8 and which has a front open end, and in the interior of the elongated hollow member 9 is located a pair of springy contact members 10 and 11. The assembly 9–11 forms a receiving means for receiving a flash lamp 25, and the springy members 10 and 11 removably hold the flash lamp 25 and participate in the formation of an electrical circuit for igniting the flash lamp 25 in order to make an exposure. Thus, the base 24 of the flash lamp 25 is gripped between the springy elements 10 and 11 of the receiving means 9–11, and these springy elements make electrical contact with the flash lamp and form part of an electrical circuit for igniting the flash lamp when the shutter is tripped in order to make an exposure.

The electrical circuit of the flash lamp is not illustrated and conventionally includes in addition to the springy contact members 10 and 11 a battery, a condenser, and an ignition switch which is closed by the shutter when the latter is actuated in order to make an exposure.

Just to the left of the receiving means 9–11, as viewed in FIGS. 1 and 2, is located a lever 12 whose upper portion 12a is located adjacent the springy elements 10 and 11, and it will be noted that the lower wall portion of the reflector 8 is formed with a slot through which the lever 12 extends from the reflector 8 into the interior of the camera, and this slot permits the lever 12 to turn. The camera carries a pair of stationary bearings 13 and 14 which serve to support for rotary movement an elongated shaft 15 which is perpendicular to the optical axis and which fixedly carries the lever 12 between its ends, so that in this way the support means 13, 14 supports the lever 12 for turning movement. The lower arm **12*b* of the lever 12 terminates adjacent to the exposure-time setting means 5. At its lower end the arm 12b is integral with an elongated extension 16 which extends forwardly in a direction generally parallel to the optical axis. The exposure-time setting means 5 has a wall portion 22 which is formed with an opening 23, and this wall portion 22 and its opening 23 cooperate with the portion 16 of the lever 12**.

The lever 12, 16 forms a movable blocking means. If the setting means 5 is not in the position illustrated in FIGS. 1 and 2, then the opening 23 is out of alignment with the extension 16 and thus the upper end of the lever 12 cannot be moved rearwardly. At this time, which is to say when the opening 23 is out of alignment with the extension 16, if the operator should try to introduce the lamp 25 into the receiving means 9–11 the base 24 of the lamp 25 will engage the lever portion 12a and will be incapable of turning this lever portion 12a and will so that the operator will not be able to introduce the lamp 25 into the receiving means 9–11. The attempt to turn the upper end portion of the lever 12 rearwardly will result in forward movement of the extension 16, and this extension 16 will at this time only engage the rear surface of the wall 22 so that in this rest position of the lever 12 it blocks movement of the lamp 25 into the receiving means and thus the lever 12 forms a blocking means for blocking movement of a lamp 25 into the receiving means 9–11. In order to provide a proper exposure for flash illumination the setting means 5 must be placed in the position where an exposure time of 1/30 sec. will be provided, in the illustrated example, and it will be noted that when the operator has turned the setting means 5 so as to align the index 6 with the graduation 30 of the scale 7 the cutout 23 will be located in the path of movement of the extension 16 so that with this position of the setting means 5 when the operator introduces the lamp 25 into the receiving means 9–11 the lever 12 will be free to turn with its extension 16 passing into and through the opening 23, so that the blocking means 12 at this time no longer blocks the introduction of a lamp 25 into the receiving means 9–11. Thus, the setting means 5 controls the blocking means 12 to prevent displacement thereof from its blocking position unless the setting means has initially been placed in a position providing a setting at which a proper exposure for flash illumination will be made by the camera. Furthermore, it will be noted that when the setting means has been placed in the proper position permitting movement of the blocking means 12 from its blocking position, then the introduction of a lamp 25 into the receiving means 9–11 by locating the extension 16 in the opening 23 will prevent turning of the setting means 5 from the position where it provides a proper exposure for flash illumination, and thus when a lamp has been introduced into the receiving means 9–11 the blocking means 12 also acts to block the setting means from movement to an improper position, so that with the structure of the invention not only does the setting means control the blocking means to prevent a lamp from being received in the receiving means unless a proper camera setting has been provided, but also the blocking means after a lamp has been placed in the receiving means blocks the setting means against movement to an improper position.

The end of the shaft 15 distant from the lever 12 fixedly carries an additional lever 17 to which a spring 18 is connected, this spring 18 being connected at its end distant from the lever 17 to a stationary pin 19 which is carried by the camera, and thus the spring 18 acts through the lever 17 on the shaft 15 to turn the latter in the direction of the arrow a to a position where the upper end portion 12a of the blocking lever 12 is located in the path of movement of a lamp which is introduced into the receiving means 9–11. A pin 26 is carried by a stationary part of the camera and is located in the path of turning movement of the lever 17 to limit the turning movement thereof by the spring 18 so as to determine the forward position of the upper end portion 12a of the lever 12.

Moreover, an elongated manually-engageable member 20 is pivotally connected with the lever 17 and extends through an opening in the front wall 21 of the camera so that the front end of the member 20 is accessible to the operator. After the lamp 25 has been ignited so that it is necessary to replace it with another lamp, the operator can press the elongated member 20 rearwardly in the direction of the arrow b so as to turn the shaft 15 in the direction of the arrow a and thus move the upper end 12a of the lever 12 forwardly to eject the lamp 25 from the receiving means 9–11, so that in this way the manually-engageable member 20 is accessible to the operator to permit operation of the lever 12 as in ejecting means for ejecting the lamp 25 from the reflector 8. Of course, the springy force exerted by the elements 10 and 11 of the receiving means 9–11 on the portion 24 of the lamp 25 is greater than the force of the spring 18 so that the lamp 25 will be maintained by the springy elements 10 and 11 in the position illustrated in FIGS. 1 and 2 in opposition to the spring 18.

After an exposure has been made the operator will actuate the member 20 in order to eject the lamp 25 from the receiving means 9–11, as described above, and it will be noted that this operation also results in movement of the extension 16 out of the cutout 23, so that now the setting means 5 can be turned by the operator if desired. When the lever 17 is held against the pin 26 by the spring 18, the extension 16 is displaced behind the wall 22 so that it does not in any way interfere with the operation of the setting means 5.

Figure 3:
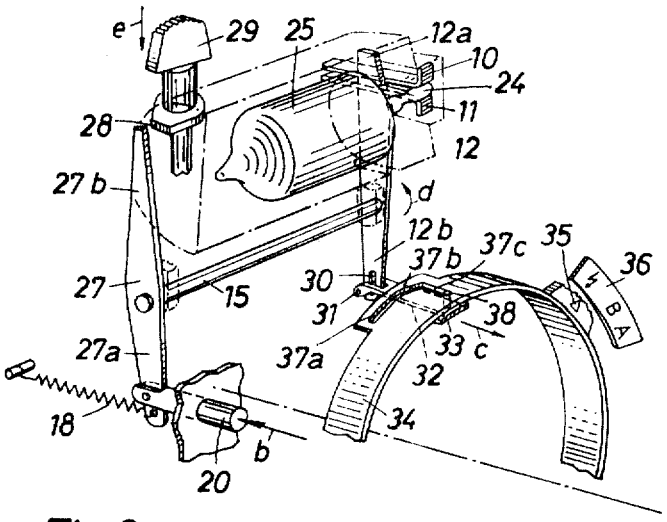
FIG. 3 is a perspective view of another embodiment of a structure according to the present invention.

In the embodiment of the invention which is illustrated in FIG. 3, there is shown a shutter-actuating means 29 which is depressed by the operator in the direction of the arrow e in order to trip the shutter and make an exposure. This shutter actuating means 29 carries a collar 28 which is fixed to the shutter actuating means 29.

The shaft 15 again carries the lever 12, but the lever 17 of FIG. 2 is replaced by a lever 27 which has an upper arm 27b adapted to cooperate with the collar 28 in a manner described below. The lower arm 27a of the lever 27 is connected to the elements 18 and 20 in the same way as the lever 17 of FIG. 2, and these parts operate in the same way as the embodiment of FIG. 2.

A further distinction of the embodiment of FIG. 3 as compared to that of FIG. 2 resides in the fact that the lower end 12b of the lever 12 is formed with an elongated slot 30 receiving a pin 31 which is fixed to an elongated slide member 32 which is supported for shifting movement in the direction of the arrow c by a stationary plate 33 located beneath the slide member 32, and at the upper side of the slide member 32 is located a ring 34 which is supported for rotation about the optical axis and which forms the setting means for setting part of the camera which determines the exposure made thereby, such as the exposure-time setting structure of the camera. The exposure time setting means 34 carries an index 35 capable of being aligned with a selected graduation of the scale 36, and of course the part of the ring 34 which carries the index 35 is accessible to the operator so that the operator can turn the ring 34. The setting means 34 is formed with a cutout in the form of an elongated slot having portions 37a, 37b and 37c, and it will be noted that the intermediate portion 37b communicates with and forms extensions of the slot portions 37a and 37c. The slot portion 37a extends along a circle whose center is in the optical axis while the slot portion 37b is inclined with respect to the slot portion 37a and at its right end, as viewed in FIG. 3, joins the slot portion 37c which extends parallel to the optical axis and is perpendicular to the slot portion 37a. A pin 38 is received in the slot formed by the portions 37a–37c, and this pin 38 is fixedly carried by the slide member 32, so that through the pin 38 and the slide member 32 the setting means 34 is operatively connected to the movable blocking means formed by the lever 12.

In the position of the parts shown in FIG. 3 a lamp 25 has already been introduced into the receiving means and the base 24 of the lamp 25 has turned the lever 12 and all of the parts connected thereto in the direction of the arrow d to the illustrated position. Thus, the shaft 15 has been turned with the lever 12 and of course the lever 27 has also turned with the lever 12. During this turning of the lever 12 the slide member 32 has shifted forwardly so that the pin 38 is located at the front end of the slot portion 37c. Thus, the turning of the shaft 15 in opposition to the spring 18 by introduction of the lamp 25 into the receiving means has displaced the upper end 27b of the lever 27 from beneath the collar 28 so that the operator can depress the shutter-actuating means 29 in order to make an exposure.

In order to remove the lamp 25 after an exposure has been made with the embodiment of FIG. 3 the operator will again push the elongated member in the direction of the arrow b, thus turning the shaft 15 in a direction opposite to that indicated by the arrow d, and this will move the portion 12a of the lever 12 forwardly to eject the lamp 25 from the receiving means. Because of the pin-and-slot connection between the lever arm 12b and the slide member 32, this slide member is retracted so as to locate the pin 38 at the rear end of the slot portion 37c. Thus, the pin 38 is placed in alignment with the slot portion 37b, and the spring 18 holds the parts in this position at this time. In this position of the parts where the pin 38 is at the junction between the slot portions 37b and 37c the upper end 27b of the lever 27 is beneath the collar 28 so that the lever 27 blocks the shutter actuating means against operation by the operator.

In order to be able to make an exposure it is necessary either to introduce another lamp 25 into the lamp-receiving means 10, 11 so as to again turn the lever 27 to the position illustrated in FIG. 3 where it does not block movement of the shutter-actuating means 29 in the direction of the arrow e or it is necessary to turn the setting means 34 so as to locate the index 35 in alignment with the graduation B or the graduation A of the scale 36. During turning of the setting means 34 in order to provide such a setting, the intermediate slot portion 37b moves with respect to the pin 38 so as to continue the displacement thereof rearwardly, in a direction opposite to that indicated by arrow c in FIG. 3, and this continued turning of the ring 34 will place the slot portion 37a in a position receiving the pin 38, and when the slot portion 37a reaches the pin 38 the index 35 will be in the vicinity of the graduation B, and while the slot portion 37a remains in position receiving the pin 38 the index 35 can be aligned with either of the graduations B or A of the scale 36. When the slot portion 37a receives the pin 38 this pin has been retracted through a distance sufficient to have turned the lever 12 in a direction opposite to that indicated by the arrow d to an angle which is great enough to locate the upper end portion 27b of the lever 27 forwardly of the collar 28 so that in this position of the parts it is also possible to operate the shutter-actuating means 29.

Thus, with the embodiment of FIG. 3 unless the pin 38 is received either in the portion 37a or in the slot portion 37c the shutter-actuating means 29 cannot be operated. Moreover, unless the slot portion 37c is in alignment with the pin 38 the operator cannot introduce a lamp 25 into the receiving means since it will not be possible for the pin 38 to shift forwardly during rearward movement of the upper portion of the lever 12, and thus the lever 12 blocks introduction of a lamp 25 into the receiving means until the operator first places the index 35 in alignment with the graduation of the scale 36 which indicates the proper setting for flash exposure, and only when the setting means 34 has been placed in this latter position is the slot portion 37c located along the path of movement of the pin 38 so that the lamp 25 can be introduced and turn the lever 12 and the parts connected thereto to the position indicated in FIG. 3.

Figure 4:
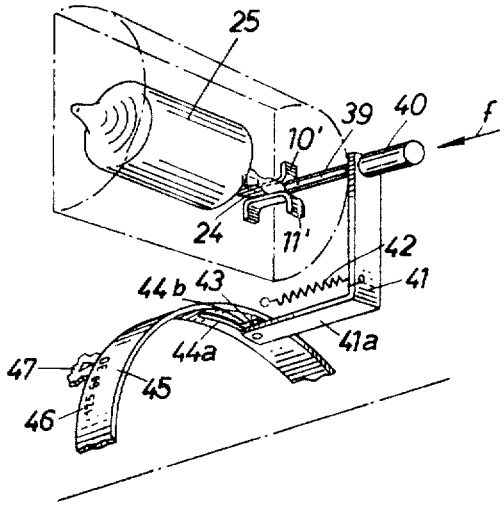

According to the embodiment of the invention which is illustrated in FIG. 4, instead of a movable blocking means formed by the lever 12, there is a shiftable member 41 of substantially L-shaped configuration which is supported for forward and rearward shifting movement in a direction parallel to the optical axis, and this shiftable member 41 fixedly carries at its upper end a forwardly directed pin 39 which is adapted to extend between the springy elements 10′, 11′ which grip the base 24 of the lamp 25, and when the base 24 is introduced between the springy elements 10′, 11′ it will move the pin 39 and the member 41 therewith rearwardly in opposition to a spring 42 which urges these parts forwardly in the direction of the arrow f. An elongated, manually engageable member 40 is fixed to and extends rearwardly from the upper portion of the member 41 through an opening in the rear wall of the camera so that the operator can push on the member 40 so as to displace the member 41 and the pin 39 therewith forwardly in order to eject from the receiving means a lamp 25 after the latter has been ignited in order to make an exposure.

The lower portion 41a of the shiftable member 41 fixedly carries at its front end a pin 43 which is received in a slot formed in a rotary exposure-time setting means 45 carrying a scale 46 of exposure times, and the graduations of this scale are adapted to be aligned with a stationary index 47. The slot of the setting means 45 which receives the pin 43 has a circumferential portion 44a extending along the circle whose center is in the optical axis and an axial portion 44b perpendicular to the portion 44a and extending parallel to the optical axis.

After an exposure with flash illumination has been made the operator will push the member 40 forwardly in the direction of the arrow f so as to cause the pin 39 to eject the lamp 25 from the receiving means, the pin 39 extending at this time into the space between the springy lamp-receiving members 10', 11', and of course the force of these springy members is greater than that provided by the spring 42. This pushing by the operator of the member 40 advances the entire blocking means 39, 41 forwardly so as to displace the pin 43 to the front end of the slot portion 44b at the junction between the slot portions 44a and 44b. Now the operator can either introduce another lamp 25 or the operator can turn the ring 45 so as to provide an exposure time different from that which is required for exposure with flash illumination. Assuming that the setting means 45 is in the position indicated where it will provide an exposure time proper for exposure with flash illumination if the operator introduces the lamp 25 into the receiving means the base 24 of the lamp will displace the pin 39 rearwardly and thus will displace the entire shiftable means 41 in opposition to the spring 42 rearwardly, the slot portion 44b at this time being located along the path of movement of the pin 43 so that the latter moves rearwardly along the slot portion 44b, and thus the location of the setting means 45 initially in the position providing a proper exposure time for flash illumination will release the blocking means 39, 41 so that it can be displaced rearwardly by a lamp which is introduced into the receiving means. Moreover, it will be noted that with the embodiment of FIG. 4, as well as with the embodiment of FIG. 3, the fact that a lamp is in the receiving means locates the blocking means in a position where it blocks the exposure-time setting means from movement to a position different from that required for an exposure with flash illumination, so that the structures of FIGS. 3 and 4 provide the same results as the embodiment of FIG. 2 with respect to blocking of movement of the exposure time setting means from a position providing a proper exposure for flash illumination when a lamp is received in the receiving means.

When the flash lamp has been ejected from the receiving means in the manner described above, the pin 43 is in alignment with the slot portion 44a so that the operator can turn the setting means 45 in order to provide an exposure time different from that required for flash illumination. However, it will be noted that if the setting means 45 has been displaced to a position providing an exposure time different from that required for flash illumination, then the slot portion 44b is no longer in alignment with the pin 43 and when the operator attempts to introduce a lamp into the receiving means the pin 39 will be unable to move rearwardly and will thus block introduction of a lamp into the receiving means so that the operator will know that he must first set the exposure time to provide a proper exposure for flash illumination before the lamp can be introduced into the receiving means.

It will be understood that each of the elements described above, or two or more together, may also find a useful application in other types of cameras differing from the types described above.

While the invention has been illustrated and described as embodied in cameras with flash illumination, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, receiving means for receiving a flash lamp; movable means having a given rest position and located in the patch of movement of a lamp into said receiving means to be moved by the lamp from said rest position to a release position; support means supporting said movable means for movement; and shutter-actuating means for tripping the shutter of the camera to make an exposure, said movable means when in its rest position blocking operation of said shutter actuating means and in its release position releasing said shutter actuating means for operation, so that only after a lamp is introduced into said receiving means to move said movable means from said rest to said release position thereof can said shutter actuating means be operated to trip the shutter and make an exposure.

2. In a camera, in combination, receiving means for receiving a flash lamp; shutter-actuating means movable along a given path by the operator for tripping a shutter of the camera to make an exposure; setting means for setting the camera, at least in part, to determine the exposure made thereby; support means; and blocking means supported for movement by said support means, controlled by said setting means and having a portion located in the path of movement of a lamp into said receiving means, said setting means preventing movement of said portion of said blocking means by a lamp unless said setting means is in a position providing a proper setting for exposure with flash illumination and said blocking means being located in said path for blocking movement of said shutter-actuating means along said given path unless said blocking means is moved by a lamp inserted into said receiving means, said blocking means then moving from its position located in said path to a position where said blocking means is out of said path for releasing said shutter-actuating means for operation, so that on the one hand a lamp cannot be received in said receiving means unless said setting means provides a predetermined setting and on the other hand said shutter-actuating means cannot be operated until a lamp is placed in said receiving means.

3. In a camera, in combination, receiving means for receiving a flash lamp; support means; movable blocking means supported for movement of said support means and having a portion located in the path of movement of a lamp into said receiving means to be moved by the lamp for displacing said movable blocking means from a blocking position to an operating position, said movable blocking means having a control portion movable along a given path during movement of said movable blocking means from said blocking to said operating position thereof; and setting means for setting at least part of the structure of the camera which determines the exposure made thereby, said setting means being formed with a cutout located at said path only when said setting means is in a position providing an exposure proper for flash illumination and said setting means in all other positions engaging said control portion of said movable blocking means to prevent movement of the latter from said blocking to said operating position thereof and thus to prevent movement of a lamp into said receiving means, said setting means when set in a position providing a proper setting for an exposure with flash illumination locating said cutout thereof at said path to receive said control portion and thus free said movable blocking means for movement from said blocking to said operating position thereof so that a lamp can be introduced into said receiving means, and said control portion, when in said cutout, preventing movement of said setting means from said position providing a proper setting for exposure with flash illumination.

4. In a camera as recited in claim 3, said control portion of said movable blocking means being in the form of a pin and said cutout of said setting means being in the form of a slot receiving said pin and having a configuration which permits movement of said pin along said path only when said setting means is in said position providing said proper exposure for flash illumination.

5. In a camera as recited in claim 3, said control portion of said movable blocking means being in the form of a pin and said cutout of said setting means being in the form of an elongated slot having a first portion receiving said pin to prevent movement of said movable blocking means from said blocking to said operating position thereof and a second portion substantially perpendicular to said first portion and extending along said path for receiving said pin and permitting movement thereof so that said movable blocking means can then be moved from said blocking to said operating position thereof.

6. In a camera, in combination, receiving means for receiving a flash lamp; support means; movable blocking means supported for movement by said support means and having a blocking position where a portion of said movable blocking means is located in the path of movement of a lamp into said receiving means, and said movable blocking means being movable by a lamp introduced into said receiving means from a blocking position to an operating position; setting means for setting at least part of the structure of the camera which determines the exposure made thereby, said setting means being operatively connected to said movable blocking means for preventing movement thereof from said blocking to said operating position unless said setting means has been placed in a position providing a proper setting for exposure with flash illumination and said blocking means when in said operating position blocking said setting means for movement away from said position providing said proper setting; spring means operatively connected to said movable blocking means for urging the latter to said blocking position thereof, and said receiving means holding a lamp therein with a force greater than that exerted by said spring means.

7. In a camera, in combination, an elongated shaft; support means supporting said shaft for rotary movement; a pair of elongated levers fixed to said shaft for turning movement therewith; receiving means located beside one of said levers, said receiving means being adapted to receive a flash lamp and said one lever being located in the path of movement of a flash lamp introduced into said receiving means to be moved by the flash lamp for turning said one lever and said shaft and the other lever therewith; setting means for setting at least part of the structure of the camera which determines the exposure made thereby, said setting means being operatively connected to said one lever for preventing turning movement thereof by a lamp introduced into said receiving means unless said setting means has first been placed in a position providing an exposure which is proper for flash illumination and said one lever preventing movement of said setting means while a lamp is in said receiving means; and shutter-actuating means for tripping a shutter to make an exposure and located adjacent said other lever, said other lever blocking operation of said shutter-actuating means unless said one lever has been turned by a lamp introduced into said receiving means to a position permitted by placing of said setting means in said position providing an exposure proper for flash illumination, so that on the one hand a lamp cannot be introduced into said receiving means and on the other hand said shutter-actuating means cannot be operated unless said setting means has first been placed in said position providing a proper exposure for flash illumination.

8. In a camera, in combination, setting means for setting at least in part the structure of the camera which determines the exposure which is made by the camera, said setting means adapted to be moved into a flash setting position providing a proper setting for an exposure with flash illumination; support means; receiving means for receiving a flash lamp introduced into said receiving means by movement of a portion of the lamp along a predetermined path; movable blocking means adapted to move between a lamp blocking position blocking introduction of a lamp into said receiving means and a lamp releasing position permitting introduction of a lamp into said receiving means along said predetermined path, said movable blocking means having a blocking portion located in said predetermined path movable in direction of said path by said lamp so that said movable blocking means is moved by said lamp during introduction thereof along said predetermined path from said lamp blocking into said lamp releasing position; and motion transmitting means cooperating with both said blocking and setting means for permitting movement of said movable blocking means from said blocking into said releasing position only when said setting means is in said flash setting position thereof.

9. In a camera according to claim 8 wherein said motion transmitting means also permits movement of said setting means from said flash setting into another position only when said blocking means is in said blocking position thereof.

10. In a camera according to claim 8, manually engageable means operatively connected to said movable blocking means and accessible to the operator for manually moving said movable blocking means from said lamp releasing position to said blocking position thereof for ejecting a lamp from said receiving means after an exposure has been made with flash illumination.

11. In a camera according to claim 8, said movable blocking means consisting of an elongated blocking lever turnably supported intermediate its ends by said support means and having one blocking end portion located in the path of movement of a lamp into said receiving means so that a lamp when introduced into said receiving means will turn said elongated blocking lever.

12. In a camera according to claim 8, said movable blocking means being supported by said support means for shifting movement and including a blocking portion located in the path of movement of a lamp into said receiving means.

*13. In a camera, in combination, setting means for setting at least in part the structure of the camera which determines the exposure which is made by the camera, said setting means adapted to be moved into a flash setting position providing a proper setting for an exposure with flash illumination; support means; receiving means for receiving a flash lamp introduced into said receiving means by movement of a portion of the lamp along a predetermined path; movable blocking means having an engaging portion located in said predetermined path movable in direction of said path by said lamp so that said movable blocking means is moved by said lamp during introduction thereof along said predetermined path from an inoperative first position into a second position, said movable blocking means also having a blocking portion cooperating with said setting means so as to maintain said setting means in said flash setting position while said movable blocking means is in said second position thereof; and manually engageable means operatively connected to said movable blocking means and accessible to the operator for manually moving said movable blocking means from said second position to said inoperative first position thereof for ejecting a lamp from said receiving means after an exposure has been made with flash illumination and for simultaneously releasing said setting means for movement from said flash setting position into other setting positions thereof.*

*14. A structure as defined in claim 13; and further comprising mounting means mounting said movable blocking means for movement along a stright path.*

*15. A structure as defined in claim 13; and further comprising means mounting said movable blocking*

*means for shifting movement to and fro along a straight path.*

*16. A structure as defined in claim 13, wherein said movable blocking means comprises an end portion, and wherein said end portion constitutes said blocking portion.*

*17. A structure as defined in claim 13, wherein said manually engageable means is movable to and fro along a straight path.*

*18. A structure as defined in claim 13, wherein said manually engageable means is movable to and fro along a straight path between a first and a second location; and further comprising biasing means permanently urging said manually engageable means to one of said locations.*

*19. A structure as defined in claim 13; and further comprising means permanently urging said movable*

*blocking means into said inoperative position with a force which is less than that required for ejecting a lamp from said receiving means.*

References Cited

The following references, cited by the Examiner, are of record in the patented file of this patent or the original patent.

UNITED STATES PATENTS

| | | | |
|---|---|---|---|
| 2,967,469 | 1/1961 | Lachaize | 95—11.5 |
| 3,005,392 | 10/1961 | Kaden | 95—11.5 |
| 3,051,066 | 8/1962 | Lareau et al. | 95—11.5 |

NORTON ANSHER, *Primary Examiner.*

F. L. BRAUN, *Assistant Examiner.*